US012462604B2

(12) United States Patent
Paudyal et al.

(10) Patent No.: US 12,462,604 B2
(45) Date of Patent: Nov. 4, 2025

(54) METHOD AND SYSTEM FOR VERIFYING UPLOADED CUSTOMER PHOTOGRAPHS

(71) Applicant: U-Haul International, Inc., Phoenix, AZ (US)

(72) Inventors: Prajwal Paudyal, Peoria, AZ (US); Sameer Dongare, Phoenix, AZ (US); Artie Tonan, Phoenix, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 495 days.

(21) Appl. No.: 17/805,440

(22) Filed: Jun. 3, 2022

(65) Prior Publication Data

US 2022/0392258 A1   Dec. 8, 2022

Related U.S. Application Data

(60) Provisional application No. 63/196,483, filed on Jun. 3, 2021.

(51) Int. Cl.
*G06K 9/00*  (2022.01)
*G06T 7/11*  (2017.01)
*G06V 40/16*  (2022.01)

(52) U.S. Cl.
CPC .............. *G06V 40/172* (2022.01); *G06T 7/11* (2017.01); *G06T 2207/30201* (2013.01)

(58) Field of Classification Search
CPC ...... G06V 40/172; G06V 10/82; G06Q 30/06; G06Q 20/40145; G06N 20/00; G06N 3/08; G06N 3/045
See application file for complete search history.

(56) References Cited

U.S. PATENT DOCUMENTS

| | | |
|---|---|---|
| 7,991,388 B1 | 8/2011 | Becker et al. |
| 8,577,810 B1 | 11/2013 | Dalit et al. |

(Continued)

FOREIGN PATENT DOCUMENTS

WO   WO2013137181   9/2013

OTHER PUBLICATIONS

Shi, Yichun, and Anil K. Jain. "DocFace+: ID document to selfie matching." IEEE Transactions on Biometrics, Behavior, and Identity Science 1.1 (2019): 56-67. (Year: 2019).*

(Continued)

*Primary Examiner* — Gregory A Morse
*Assistant Examiner* — Owais Iqbal Memon
(74) *Attorney, Agent, or Firm* — Richard E. Oney; Venjuris, P.C.

(57) ABSTRACT

A method and system are provided for automatically verifying an image uploaded to a computer system by a customer. The method includes generating an upload prompt to request a customer to upload an image of a headshot of the customer, a front of an identification card of the customer, or a back of an identification card of the customer. The uploaded image is automatically processed with a computer-implemented classification model to attempt to classify the uploaded image as a headshot, an identification card front, or an identification card back. An uploaded headshot is processed with a face detection model to return face bounding box for the image. An uploaded identification card front is processed with an identification card detection model to generate an identification card front bounding box for the uploaded image, and with the face detection model to return an identification card face bounding box for the identification card front. An uploaded identification card back is processed with the identification card detection model to (Continued)

return an identification card back bounding box for the uploaded image.

19 Claims, 8 Drawing Sheets

(56) References Cited

U.S. PATENT DOCUMENTS

| | | | |
|---|---|---|---|
| 9,240,990 B1 | 1/2016 | Ruma | |
| 9,292,982 B1 | 3/2016 | Higgs et al. | |
| 2002/0186144 A1 | 12/2002 | Meunier | |
| 2008/0067242 A1 | 3/2008 | Bonalle et al. | |
| 2009/0321517 A1 | 12/2009 | Deane et al. | |
| 2010/0106608 A1 | 4/2010 | Menendez et al. | |
| 2010/0280700 A1 | 11/2010 | Morgal et al. | |
| 2011/0040692 A1 | 2/2011 | Ahroon | |
| 2011/0058048 A1 | 3/2011 | Elazar et al. | |
| 2011/0112969 A1 | 5/2011 | Zaid et al. | |
| 2011/0141534 A1* | 6/2011 | Safonov | H04N 1/3878 358/474 |
| 2011/0276484 A1 | 11/2011 | Pearson et al. | |
| 2011/0288891 A1 | 11/2011 | Zaid et al. | |
| 2011/0307375 A1 | 12/2011 | Maney | |
| 2011/0313937 A1 | 12/2011 | Moore, Jr. et al. | |
| 2012/0070029 A1 | 3/2012 | Muriello et al. | |
| 2012/0105197 A1 | 5/2012 | Kobres | |
| 2012/0114196 A1 | 5/2012 | Lee | |
| 2012/0200390 A1 | 8/2012 | Saravanan | |
| 2012/0323930 A1 | 12/2012 | Kennberg et al. | |
| 2013/0011820 A1 | 1/2013 | Yancosek | |
| 2013/0073349 A1 | 3/2013 | Kolling | |
| 2013/0221101 A1 | 8/2013 | Lebaschi et al. | |
| 2013/0222616 A1 | 8/2013 | Mendis | |
| 2013/0317693 A1 | 11/2013 | Jefferies | |
| 2013/0325521 A1 | 12/2013 | Jameel et al. | |
| 2016/0063616 A1 | 3/2016 | Bassett | |
| 2017/0039489 A1 | 2/2017 | Reh et al. | |
| 2018/0204279 A1 | 7/2018 | Painter et al. | |
| 2019/0095877 A1 | 3/2019 | Li | |
| 2019/0294900 A1* | 9/2019 | Li | G06V 40/70 |
| 2020/0279128 A1* | 9/2020 | Hoehne | G06F 18/2113 |
| 2022/0019786 A1* | 1/2022 | Huang | G06V 20/62 |

OTHER PUBLICATIONS

Nguyen Van Nam, Vu, Hanh and Thuyen Nguyen Hoang. "An efficient deep face matching method for ID and selfie photos: SIRFace." Twelfth International Conference on Digital Image Processing (ICDIP 2020). Vol. 11519. SPIE, 2020. (Year: 2020).*

Albiero, Vítor, et al. "Identity document to selfie face matching across adolescence." 2020 IEEE International Joint Conference on Biometrics (IJCB). IEEE, 2020. (Year: 2020).*

* cited by examiner

Fig. 8. Usage Scenerio 1 with no bounding boxes.

METHOD AND SYSTEM FOR VERIFYING UPLOADED CUSTOMER PHOTOGRAPHS

BACKGROUND

This invention generally is directed to an online method and system for automatically verifying photographs uploaded to a vendor computer system by a customer. More particularly, it relates to a method and system that allows a vendor, such as a vehicle or equipment rental company, to automatically verify that a photograph requested by the vendor and uploaded by a customer to the vendor is the correct type of photograph.

With present systems and methods for renting vehicles, such as renting trucks for self-moving, the process for approving a rental customer for a rental transaction (i.e., qualifying the customer) often involves comparing photographic images uploaded by a customer to the rental vendor. For example, as part of the customer verification process, a customer may be required to upload a headshot photograph of their face and a photograph of their driver's license for review by a vendor representative. In doing so, customers are known to sometimes upload an incorrect photo type. For example, the customer may have been requested to take and upload a photograph of their face, but they mistakenly take and upload a photograph of their driver's license, or vice versa. Or a customer may have been requested to upload a photograph of the front of their driver's license, but they instead upload a photograph of the back of their license, or vice versa. When this happens, the vendor representative has to engage the customer to re-take the requested photographs, which process is time consuming and inefficient.

In addition, due to the nature of customers taking their own photographs, the photographs may not be centered on the region of interest (ROI) to the vendor. For example, for a headshot photograph, the ROI is typically the customer's face. For the front of a customer driver's license there may be two regions of interest, i.e. (i) the driver's license itself (without any background), and (ii) a headshot photo on the front of the driver's license. For a photograph of the back of a customer driver's license, the ROI can be the back of driver's license itself (without any background).

It is an object of the present invention to provide a method and system that can automatically classify an uploaded photograph to determine if it is the correct type of photograph.

It is another object of the present invention to provide a method and system that can automatically determine the region of interest for an uploaded photograph based on the type of the photograph.

Yet another object of the present invention is to provide such a method and system than can decrease the time customer service representatives (CSRs) spend on such qualification, Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification and the appended claims.

SUMMARY

To achieve the foregoing objects, and in accordance with the purposes of the invention as embodied and broadly described in this document, there is provided a method and system for automatically verifying an image uploaded to a computer system by a customer. One exemplary method of the invention includes: (i) generating an upload prompt to request a customer to upload an image of a requested type to a computer system, wherein the requested type of image comprises one of a headshot of the customer, a front of an identification card of the customer, or a back of an identification card of the customer; (ii) receiving with the computer system an image uploaded in response to the upload prompt; and (iii) automatically processing the uploaded image with a computer-implemented classification model operative to attempt to classify the uploaded image as one of a headshot, a front of an identification card, or a back of an identification card. If the classification model classifies the uploaded image as a headshot, the uploaded image is automatically processed with a face detection model operative to return a headshot return result that includes a face bounding box for the uploaded image. If the uploaded image is classified as a front of an identification card, the uploaded image is automatically processed with an identification card detection model operative to return an identification card front return result that includes an identification card front bounding box for the uploaded image, and the identification card front bounding box is used to process the uploaded image with the face detection model to return an identification card headshot return result that includes an identification card face bounding box for the uploaded image. If the classification model classifies the uploaded image as a back of an identification card, the uploaded image is processed with the identification card detection model to return an identification card back return result that includes an identification card back bounding box for the uploaded image.

Another exemplary method of the invention includes automatically processing an uploaded image with a classification model operative to return (i) a first probability that the image comprises an image of a headshot, (ii) a second probability that the image comprises a front of an identification card, and (iii) a third probability that the image comprises a back of an identification card. The method also includes the step of using the returned first probability, second probability and third probability to classify the image as one of a headshot, a front of a driver's license, or a back of a driver's license. If the uploaded image is classified as a headshot, it is automatically processed with a face detection model to return a face bounding box for the uploaded image. If the uploaded image is classified as a back of an identification card or a front of an identification card, the uploaded image is processed with an identification card detection model to return an identification card bounding box for the uploaded image. If the uploaded image is classified as a front of an identification card, the uploaded image is processed with the face detection model to also return a face bounding box for the uploaded image.

In some embodiments, the classification model can comprise a convolutional neural network. In some embodiments, the identification card detection model can comprise a region-based convolutional neural network that can be used for object detection and segmentation to generate the bounding box of the detected identification card. In some embodiments, the face detection model can comprise a single-stage face detector model.

BRIEF DESCRIPTION OF THE DRAWINGS

The accompanying drawings, which are incorporated in and constitute a part of the specification, illustrate the presently preferred methods and embodiments of the invention and, together with the general description given above and the detailed description of the preferred methods and embodiments given below, serve to explain the principles of the invention.

DETAILED DESCRIPTION

Reference will now be made in more detail to presently preferred methods and embodiments of the invention, as illustrated in the accompanying drawings. While the invention is described more fully with reference to these examples and drawings, the invention in its broader aspects is not limited to the specific details, representative devices, and illustrative examples shown and described. Rather, the description, which follows is to be understood as a broad, teaching disclosure directed to persons of ordinary skill in the appropriate arts, and not as limiting upon the invention.

According to one aspect of the present invention, a photograph verification system is used to automatically classify an image uploaded by a vehicle rental customer. Such a customer can use a mobile computer device, such as a smart phone, to communicate with a rental management computer system to provide information that can be used to quickly qualify the customer for a rental transaction, including an image of the customer's driver's license and an image of the customer.

Computer Network System

Figure 1:
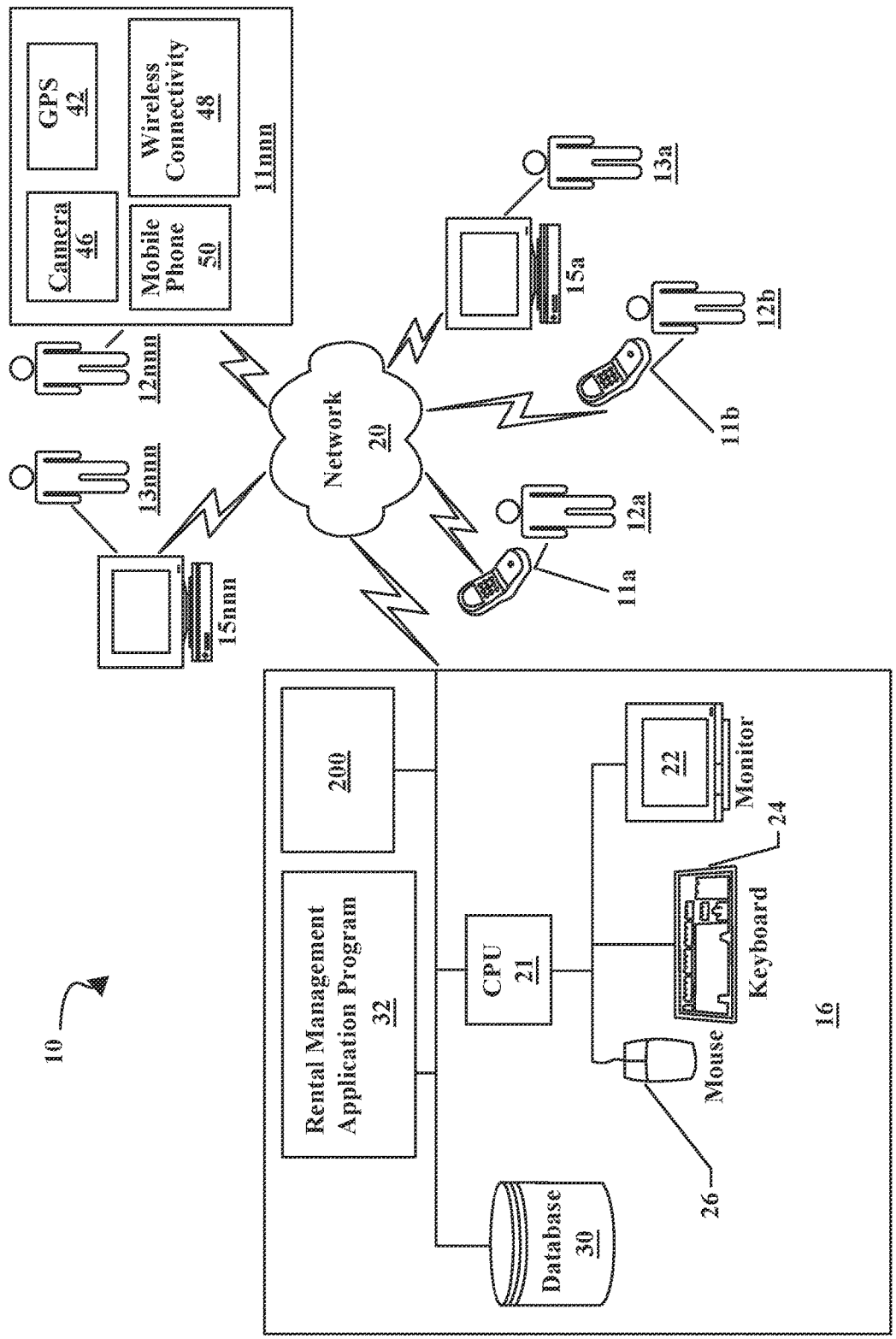
FIG. 1 is a functional block diagram of one embodiment of a computer system and network, which system includes a rental management application program that can calls a photograph verification system for verifying uploaded photographs according to the present invention.

FIG. 1 illustrates a preferred computer network system 10 for practicing the present invention. The computer network system 10 includes a rental management computer system 16, which hosts a website and stores and processes the information for creating an account for a customer, quickly qualifying the customer for a rental transaction, processing the transaction and confirming the transaction to the customer. Customers 12 can access and communicate with the rental management computer system 16 via mobile computer devices 11a, 11b and 11nnn, (where nnn refers to any number of users and user devices) coupled to the rental management computer system 16 via a computer network 20, such as the Internet, or by other suitable communications means. In addition, in a presently preferred embodiment, rental customers 13a-13nnn can use computers 15a-15nnn coupled to the computer system 16 via the computer network 20. In a preferred embodiment of the invention, the computer network 20 comprises the Internet and the mobile computer devices 11 and computers 15 each have a web browser application or other app for accessing content on the Internet. The mobile computer device 11 can be, by way of example, a smart phone or similar device. In a preferred embodiment, the mobile computer device 11 includes a web browser, a global positioning system (GPS) program 42, a digital camera 46, wireless connectivity 48 and a mobile telephone 50. Upon reading this specification, those skilled in the art will understand that, under appropriate circumstances, considering issues such as developments in computer hardware, software and connectivity, etc., other network configurations and devices also may suffice. For example, the mobile computer device 11 can be any mobile device suitable for communication over the Internet, including without limitation, smartphone, PDA, handheld mobile digital electronic device, tablet computer, portable computer or the like.

Still referring to FIG. 1, the rental management computer system 16 includes a central processing unit (CPU) 21 for processing data and program instructions. The rental management computer system 16 also includes input and output devices, as is well known in the art. For example, the rental management computer system 16 can include a display screen or monitor 22, a keyboard 24, a mouse 26, a printer (not shown), etc. The rental management computer system 16 further includes data storage and memory devices, as are known in the art, for storing a database 30. The database 30 is used to store customer data and other rental data required to provide the functionality described below. Preferably, the database 30 is a relational database, as is well known in the art. A rental management application program 32 is operable with the database 30 and the mobile computer device 11 to provide certain of the functionality described below. As part of the rental qualification process, the rental management computer system 16 can require a user to upload a photographic image of the customer to compare against the customer's driver's license photo that previously has been uploaded to the system 16 and stored in the database 30. The rental management application program 32 is operable to call or invoke the functions of the photograph verification system 200 as described below. Although shown in FIG. 1 as part of the rental management computer system 16, having read this disclosure those of skill in the art will understand that the photograph verification system 200 can be deployed remotely from the rental management computer system 16.

Photograph Verification System

The photograph verification system 200 can classify photographs as well as identify key items within the photographs to aid vendor customer service representatives (CSRs) during the process of qualifying a customer for a rental transaction. An important goal of the photograph verification system 200 is to decrease the time CSRs spend on such qualification as well as to improve customer satisfaction of the qualification process. In some embodiments, the photograph verification system 200 is designed to fulfill two purposes: a) classify a given image and b) find certain regions of interest in the image. In some presently preferred embodiments the photograph verification system 200 classifies an uploaded photograph as one of a headshot, a front of an identification document (such as a driver's license), or a back of an identification document.

Figure 2:
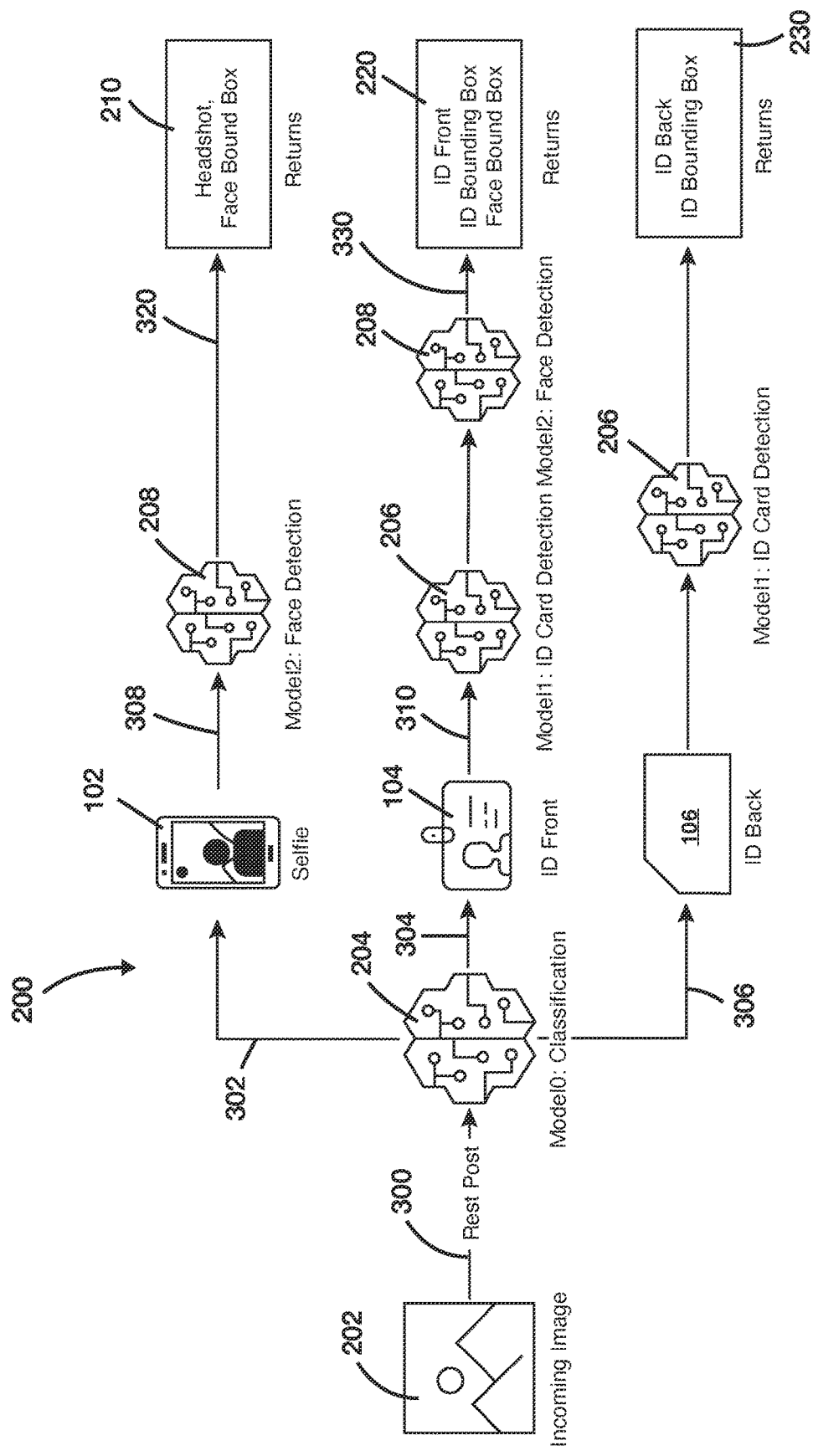
FIG. 2 is a diagram showing a pipeline of computer vision models of one embodiment of the photograph verification system shown in FIG. 1 and the process for verifying the uploaded customer photographs according to the present invention.
Figure 3:
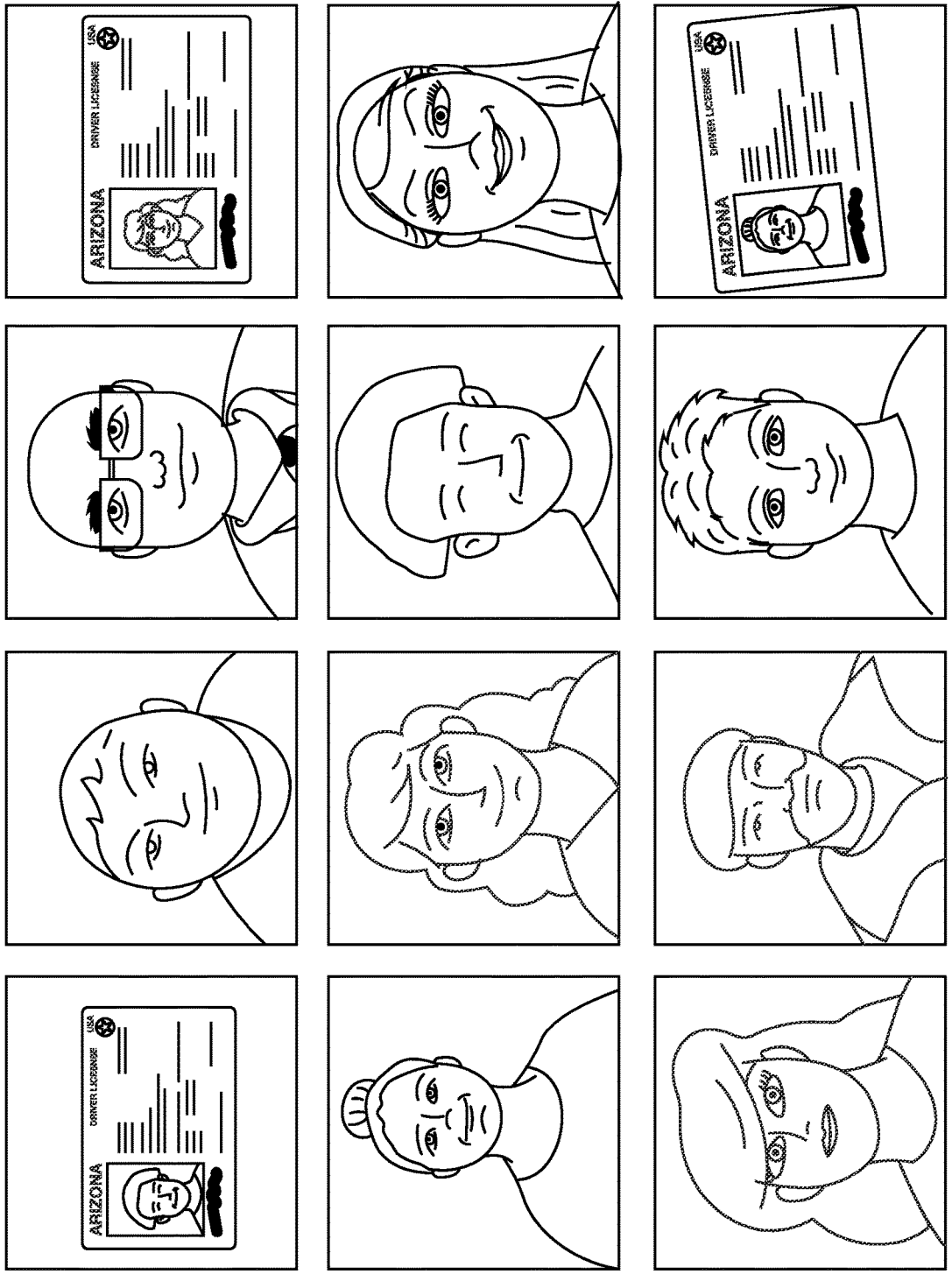
FIG. 3 shows examples of photographs that have been uploaded for classification according to the method and system of the present invention.
Figure 6:
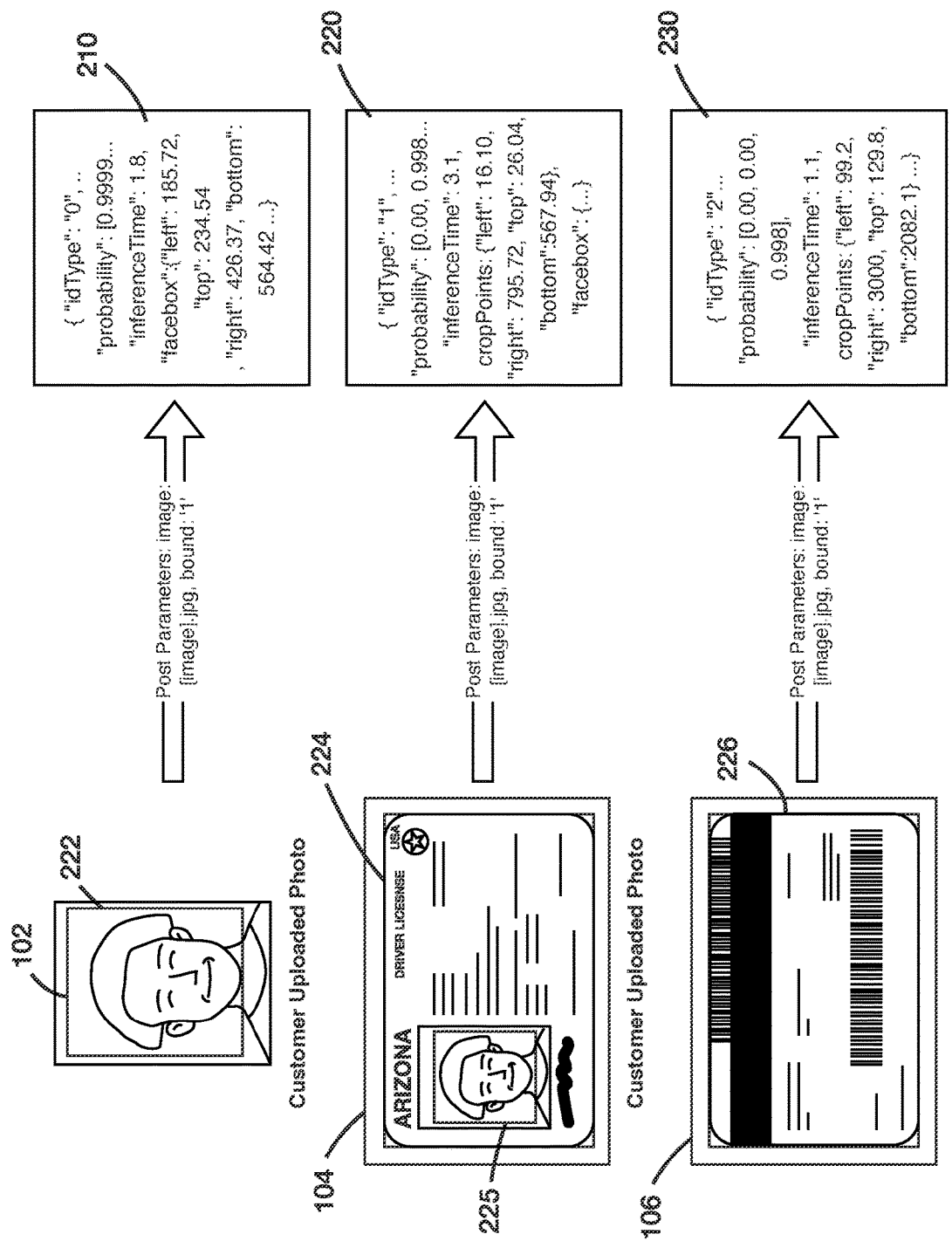
FIG. 6 is a diagram showing sample results from the photograph verification system of FIG. 2, wherein the verification system is set to generate bounding boxes for identification cards and faces detected in the uploaded photographs.

Referring to FIGS. 2 and 6, the photograph verification system 200 does so by processing an incoming image 202 using a pipeline of computer vision models. In a presently preferred embodiment, the photograph verification system 200 includes three computer vision models, i.e., a classification model 204, an identification card detection model 206 and a face detection model 208. The photograph verification system 200 processes an image as follows. The image 202 is first routed to the classification model 204 (step 300), which outputs a return result that classifies the image as one of an image of a headshot 102 (step 302), an image of a front of an identification card 104 (step 304), or an image of a back of an identification card 106 (step 306). Depending on the classification result returned by the classification model 204, the classified image is routed to additional tasks if the system is set for requesting bounding boxes. For an image classified as a headshot 102 the image is routed to the face detection model 208 (step 308), which returns a headshot result 210 (step 320) that includes the coordinates of a face bounding box 222 defining a region of interest associated with a detected face in the uploaded image. For an image classified as a front of an identification card 104, the system runs the identification card detection model 206 (step 310), which returns a result that includes coordinates of an identification card front bounding box 224 defining a region of interest associated with a detected identification card in the uploaded image. The system then routes the image and the identification card front bounding box information 222 to the face detection model 208 (step 322), which returns the coordinates of an identification card front face bounding box 225 of a detected face. Both of these bounding boxes are then appended to the return result 220 (step 330) and returned to the caller (e.g., the rental management application program 32). For an image classified as a back of an identification card 106, the system runs the identification card detection model 206 (step 312), which returns a result 230 that includes coordinates of an identification card back bounding box 226 (step 332).

Model Details

Classification Model

A Convolutional Neural Network (CNN) is a type of deep learning neural network. For implementing the classification model 204 of a prototype of the photograph verification system 200, a number of different CNNs were tested. These included the ResNet 50 V1, Resnet 50 V2, and Inception V3. After consideration of training time, model size and accuracy, the Inception V3 architecture was selected for implementation of the classification model of the prototype. The Inception V3 model was then modified and further trained using a labeled dataset as described below to implement the classification model 204.

Inception V3 by Google is the 3rd version in a series of deep learning convolutional architectures. Inception V3 was pre-trained using a dataset of 1,000 classes from the original ImageNet dataset which was trained with over 1 million training images, the Tensor flow version has 1,001 classes which is due to an additional "background" class not used in the original ImageNet. By modifying and retraining the Inception V3 model to implement the classification model 204, we were able to benefit from transfer learning in the classification model 204 from the Inception V3 model.

To fit the purposes of the present invention, the Inception V3 architecture was modified by first replacing all the fully connected layers with a global max pool layer, a new fully-connected layer and an output layer with 3 softmax nodes, which corresponds to the three-class classification of the classification model 204. The weights on the previous layers were iteratively unfrozen through training epochs. All new weights were initialized using Xavier initialization. About 27,000 images per class were used in training.

Identification Card Detection Model

The identification card detection model 206 has been implemented using a Region-based Convolutional Neural Network (R-CNN) as a means for object detection and segmentation for obtaining the identification card bounding box. A pre-trained variety of such a neural network was trained to specifically detect identification cards. R-CNNs work by using a selective search to extract a set number of regions (i.e., just 2000 regions) from an image to bypass the problem of having a huge number of possible regions, which problem is commonly seen in Object Detection techniques. In addition to the R-CNN architecture, a heuristic of choosing the centermost proposed identification card bounding box was utilized because uploaded photos of identification cards have one subject matter and customers most often center the photo accordingly. Having read this disclosure, those of skill in the art will recognize that other alternatives to the R-CNN could be used to implement the identification card detection model. Such alternatives can include, for example, Fast RCNN, Faster R-CNN or YOLO, although they require additional time for labeling on custom classes.

Face Detection Model

In some embodiments of the photograph verification system 200, the face detection model 208 can be implemented using a single-stage face detector model. A traditional computer vision HOG+SVM model was tested first for simplicity. However, the model did not give very good accuracies, especially if the images had a non-vertical orientation of faces. In one advantageous embodiment, RetinaFace (which is a state-of-the-art robust single-stage face detector model) was utilized. RetinaFace, according to the authors, performs a pixel-wise localization on various scales of faces by utilizing additional signals obtained from supervised and self-supervised multitask learning. In some embodiments, the face detection model 208 utilizes RetinaFace for only face detection, however, the same model can also be used for facial landmark features detection and face localization mesh.

Design of Experiments

Classification and object detection are two of the most common usages of computer vision systems. Classification systems are usually evaluated with metrics like Evaluation Accuracy, Precision, Recall, F-1 Score. Object detection systems are generally posed as a regression problem where the coordinates of interesting objects are regressed as floating-point numbers and loss functions are designed to minimize the off-set as much as possible.

Both of these computer vision problems are instances of supervised learning. The supervision in supervised learning comes from a labeled dataset. In other words, lots of examples where the answer to "what class does this item belong to" or "where in the image is this item" is known. Labeling is usually done by humans on the training dataset. For the classification problem, the items can be marked as belonging to any one of the classes. For the object detection problem, a labeled dataset will have thousands or millions of pairs of images and the locations and classes of the objects that we are trying to detect.

Data Collection and Cleaning

Data collected from actual sessions that went through an online customer qualification process were used to train the classification model. Utilizing data from such online qualifications of customers for rental contracts: 1) provided the benefit of having been supervised by a CSR; and 2) avoided a distribution shift, which is a common problem that plagues machine learning systems that are trained on data that is generated by a different process than the expected usage data.

The photos that were collected during the online verification sessions were sent to a database with a unique identifier for each of these images. These identifiers were then stored as and labeled as either "Headshot", "DL Front" or "DL Back". When a CSR is asked for rectifications, the new photos and the identifiers thus produced can be stored as additional members of an array. Thus by filtering for the latest photo for each type for each contract, we could automatically leverage the supervision of CSR's for obtaining a cleaner label.

The training data set was about 30,000 images per class. Out of those 1500 images per class were set aside for validation and 1500 images were set aside for testing. Thus, about 27,000 photos were used for training for each class. The total training set size was about 81,000. The validation set was 4500 and the test set was also 4500.

The object detection models utilized here were trained on large specialized datasets that were not produced by the online verification sessions and thus a separate data collection and cleaning process was not required.

For the classification model, total accuracy and per-class accuracy were selected as performance metrics For the object detection models (i.e., the identification card detection and face detection models) of the prototype embodiment of the photograph verification system 200, metrics such as Genuine Acceptance Rate (GAR), False Acceptance Rate (FAR), and False Rejection Rate (FRR) are typically chosen. However, more nuanced metrics such as Intersection Over Union (IOU) scores can be employed to check the fit of the bounding boxes. For testing of the prototype photograph verification system, we utilized pre-trained models trained on datasets not produced by the online verification sessions. All performance evaluations were done on a hold-out test-set that was never seen by the training models.

Results and Evaluation

This section details the performance of the individual components of the prototype embodiment of the photograph verification system 200, both in terms of accuracies and execution times.

Classification Model

The classification model was tested using 4500 images that had known classification labels but had not been seen by the classification model. A test accuracy of 99.7% was achieved on all images. The per-class accuracies were 99.5%, 99.7% and 99.9% for classes headshots, DL Front and DL Back, respectively. Most of the inaccuracies consisted of blurry or hard-to-read images.

Identification Card Detection Model

For identification card segmentation, an initial result of 99.21% was achieved for the front of the identification card and a score of 98.28% was achieved for the back of the identification card. About 1000 images were visually inspected. After using the heuristic of preferring the centermost bounding box proposal a 100% accuracy was achieved for both the front and the back of the driver's license when evaluated over the same 1000 images.

Face Detection Model

In some embodiments, the face detection model 208 can be implemented as a RetinaFace face-detection model. Such as implementation has been evaluated on 1000 images for both the Headshot and DL Front. It achieved an accuracy of 100% for Headshots and 99.3% for DL Fronts. These accuracies are based on visual inspection and do not consider original labels for the faces as such labels didn't exist for the dataset. However, since humans are excellent face-detectors this is a valid approach. Also, if ground-truth labels were available, they would still be drawn by humans or an ensemble of humans.

Usage

This section details how to use the model and to set parameters to the REST API calls.

Accessing the Photograph Verification System

In some embodiments, the photograph verification system 200 can be accessed via a REST API. The inference time reported here will vary due to several factors including load, whether or not bounding boxes are requested, and the compute capabilities of the instances being hosting on.

Usage Scenario 1: No Bounding Boxes

Figure 4:
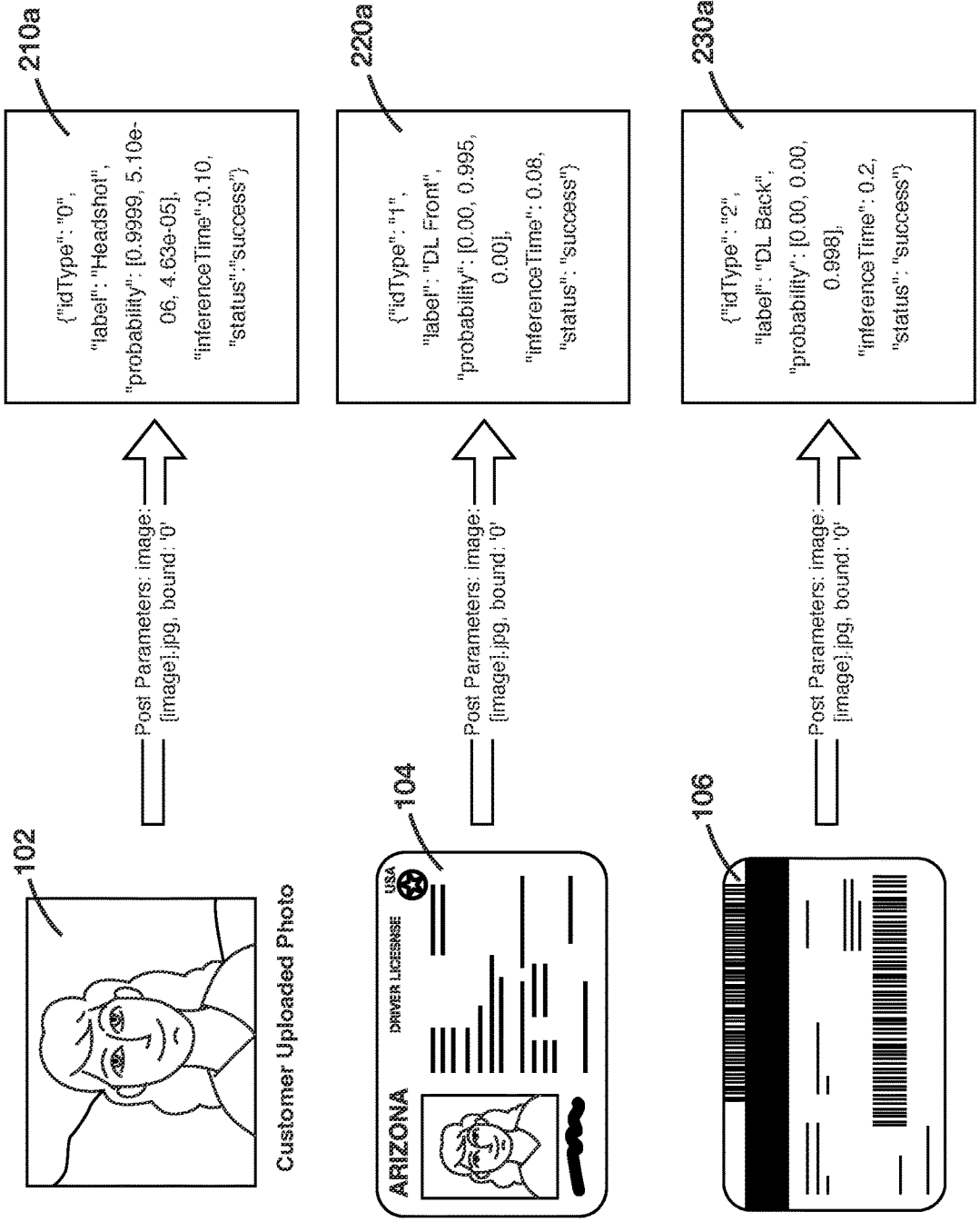
FIG. 4 is a diagram showing sample results from an exemplary embodiment of a classification model of the photograph verification system of FIG. 2 according to the present invention, wherein the verification system is set to process uploaded photographs without requesting bounding boxes for detected identification cards and faces.
Figure 8:
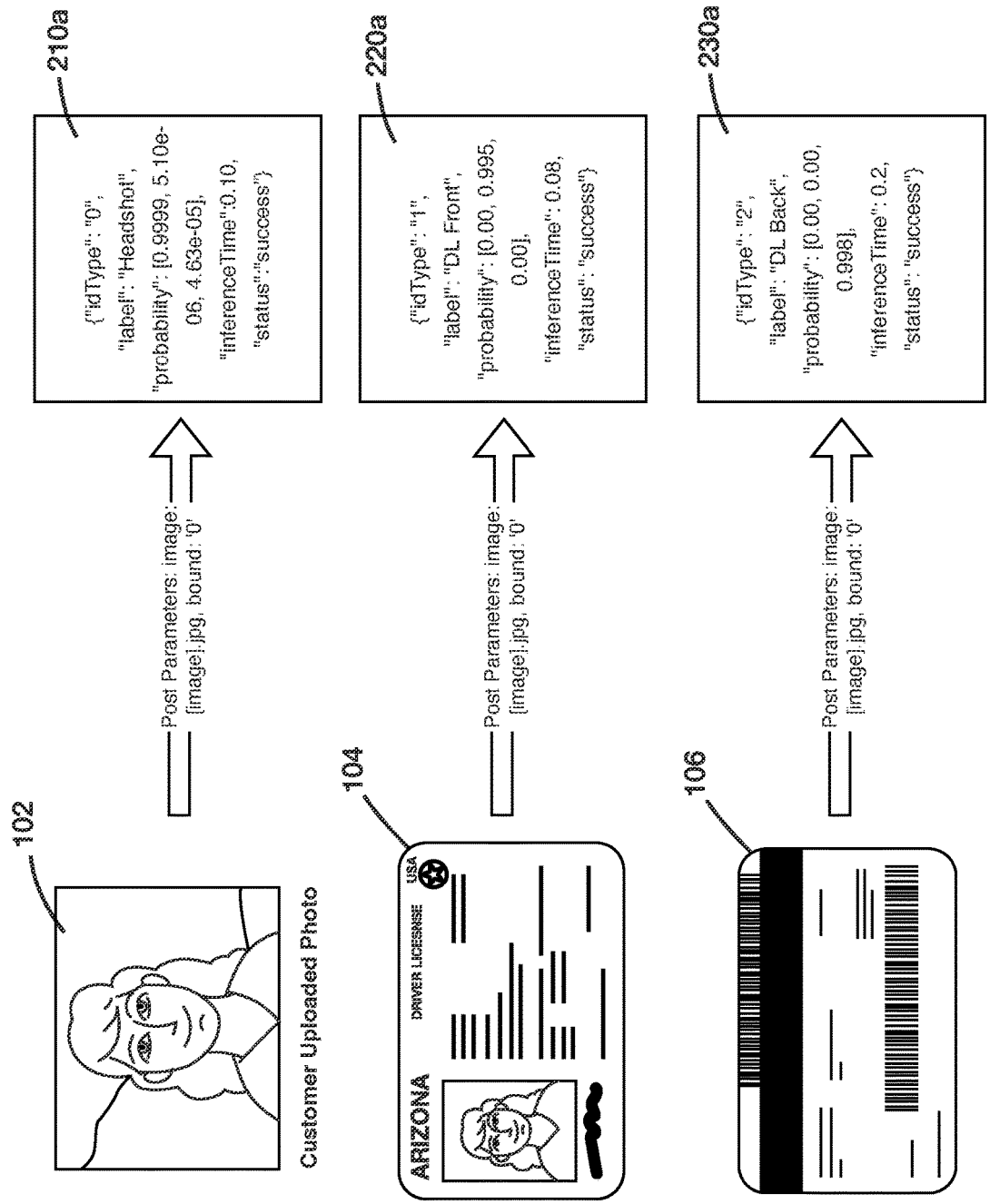
FIG. 8 is a diagram showing sample results from an exemplary embodiment of a classification model according to the present invention without requesting bounding boxes for the identification cards and faces detected.

Referring to FIGS. 4 and 8, to run only the classification model without requesting bounding boxes for the ID cards and Faces detected, set the POST parameter 'bound' to '0'. Since this does not have to run the entire model pipeline outlined in FIG. 2, the inference time is much faster. In this scenario, return results 210a, 220a, 230a include five items that returned as a JavaScript Object Notation (JSON) object:
1) idType: This will be 0 for Headshot, 1 for DL Front and 2 for DL Back. The decision is based on an Argmax function performed to find the classification with the largest probability score.

2) label: This is the pre-defined label for each of the idTypes. One of 'Headshot', 'DL Front' and 'DL Back'
3) probability: This returns the raw probability scores that the model outputs for each of the classes. The model makes a decision on what class type the photo belongs to based on these scores. This is a list of three floating point numbers between 0 and 1. This can be interpreted as the confidence the model has in its decision. If a rogue image 107 (i.e., an image not belonging to any of the classes) is sent to the service, the prediction confidence usually reflects this uncertainty as seen the return result 240*a* shown in FIG. 5.
4) inference time: The total time it took for the model to make the decision(s). This may differ from the total time for the service to return which is also affected by network latencies.
5) status: 'success' if the inference was successful. This will hold an error message if the request did not succeed.

Figure 5:
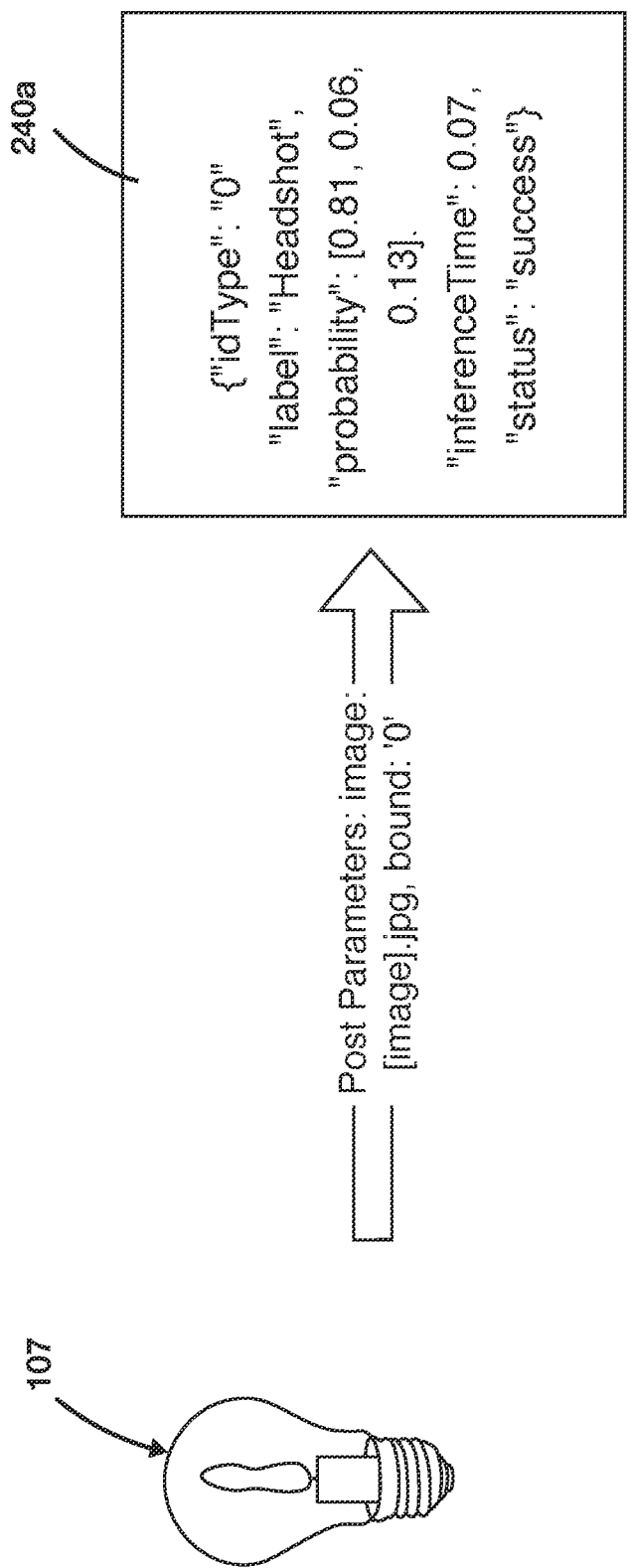
FIG. 5 is a diagram showing a sample result from an exemplary embodiment of a classification model according the present invention for a "rogue image," i.e. an image that is not a headshot, a front of an identification card, or a back of an identification card.

In addition to the example shown in FIG. 5, another example of a JSON object returned for a rogue image is:

{"predicted": {"type": 0, "label": "Headshot", "probability": 0.6870901584625244}, "all_confidences_by_type": {"0": {"label": "Headshot", "probability": 0.6870901584625244}, "1": { "label": "DL Front", "probability": 0.016807742416858673}, "2": {"label": "DL Back", "probability": 0.2961020767688751}}, "status": "fail", "reason": "No Face Detected!", "inferenceTime": 1.453096628189087}

The return result 240*a* shows relatively low probability for classification of the image as a Headshot, a DL Front or a DL Back. By setting threshold probabilities for classification success, such results can be used to determine whether the image has been successfully classified by the system. For example, a threshold probability of 0.35 could be set such that any return result probability below 0.35 would be treated as an unsuccessful classification attempt.

Usage Scenario 2: Requesting Bounding Boxes

To run the classification model, as well as to request the bounding boxes for the identification cards and faces detected, set the parameter 'bound' to '1'. The number and types of models to be run will be automatically determined by the system based on the result of the classification model as seen in FIG. 2. Sample results for this scenario can be seen in FIG. 6, in which the identification card bounding boxes 224, 226 and face bounding boxes 222, 225 detected are shown in bold lines for visualization purposes only, with the original image not being altered.

Since the system has to run one to two additional computer vision models for this scenario, the inference time will be slower. However, the system can still return an output within a few seconds. In this scenario, some information will be returned in addition to that outlined above. Only the additional information is listed below.
1) cropPoints: This will consist of four coordinates: left, right, top and bottom. These can be combined to obtain a bounding box on the original image canvas for the idcard detected. This will be returned only if the image sent is recognized as either a DL-Front or DL-Back.
2) FaceBox: This will consist of four coordinates: left, right, top and bottom. These can be combined to obtain a bounding box on the primary face image detected in the image. This will be returned only if the image sent is recognized as either a DL-Front or a Headshot. For the DL-Front the FaceBox will return the primary face in the image. A 'leftmost' heuristic is utilized following the assumption that the primary DL Front face will be on the left of the image. If this is not correct, for images for the incorrect alignment, for instance, the service can be rerun after correct alignment. This should rarely happen.

Below is comparison of exemplary JSON objects returned for an image classified according to the present invention without bounding and with bounding:

Without Bounding
 {"predicted": {"type": 2, "label ": "DL Back", " probability": 0.9978322386741638}, "all_ confidences_by_ type": {
 "0":
 {"label": "Headshot", "probability": 0.0019193653715774417},
 "1": {"label": "DL Front", "probability": 0.0002484277938492596}, "2": {"label": "DL Back", "probability": 0.9978322386741638}}, "inferenceTime": 0.12192964553833008, "status": "success"}
With Bounding
 {"predicted": {"type": 2, "label ": "DL Back", " probability": 0.9978322386741638}, "all_ conf idences_by_ type": {
 "0":
 {"label": "Headshot", "probability": 0.0019193653715774417},
 "1": {"label": "DL Front", "probability": 0.0002484277938492596}, "2": {"label": "DL Back", "probability": 0.9978322386741638}}, "cropPoints": {"left": 7.311795365065336, "right": 1668.278123140335, "top": 280.93362045288086, "bottom": 1058.5232589244843}, "inferenceTime": 0.5647921562194824, "status": "success"
 }

User Interface

Figure 7:
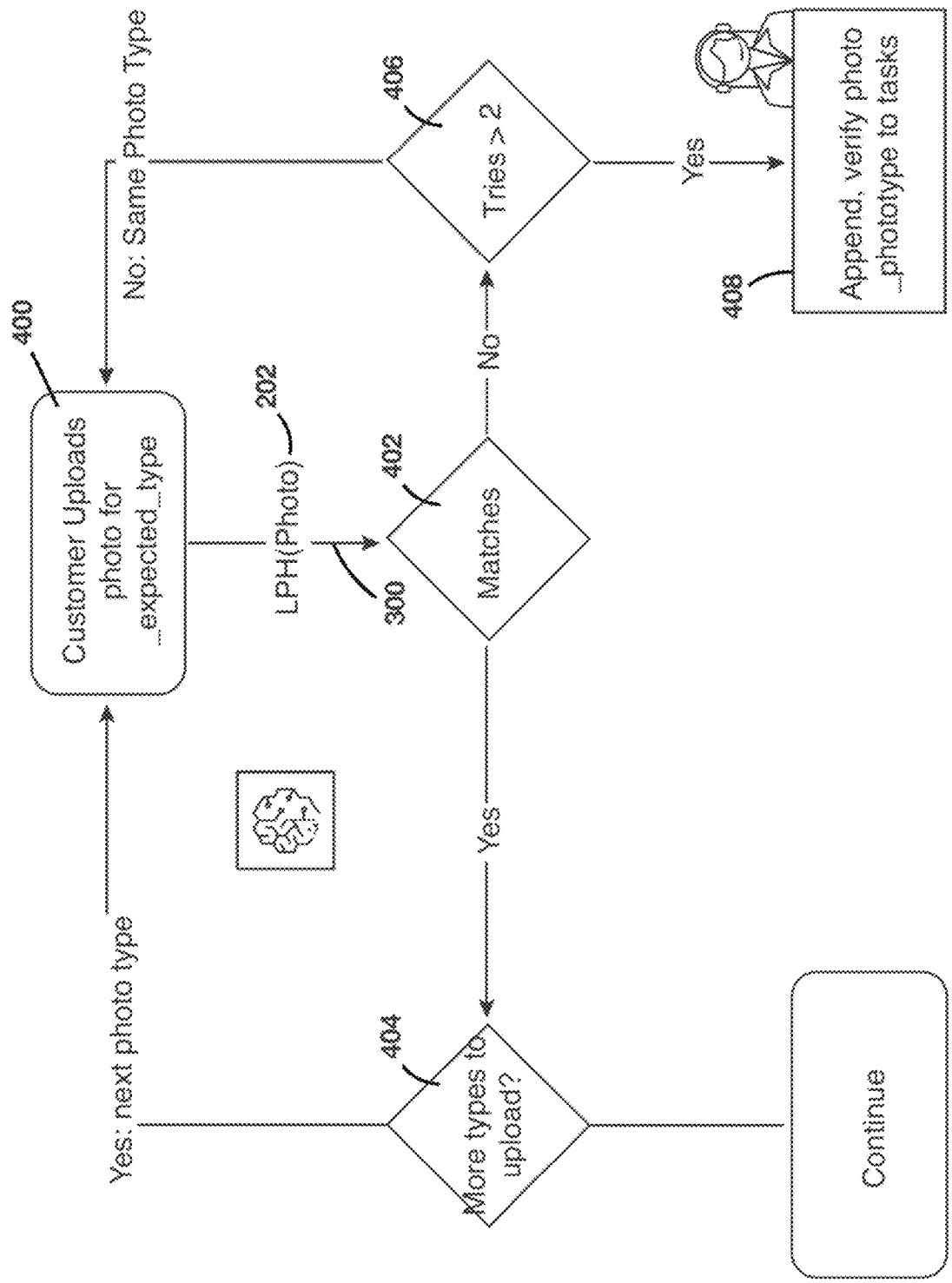
FIG. 7 is a flow diagram showing how the photograph verification system of the present invention can be used to automatically facilitate the validation of customers' photos as they are being uploaded to a rental vendor.

As shown in the flowchart of FIG. 7, the photograph verification system 200 can be leveraged to ensure that the customers' photos are being validated as they get uploaded to the rental management computer system 16 of FIG. 1 to qualify customers for rental transactions. At step 400, for example, a customer uploads a photo in response to a prompt from the rental management application program 32 to the customer to upload a particular type of photo, such as a headshot of the customer, or a driver's license front or back. At step 300, the rental management application program 32 calls the photograph verification system 200 (see FIG. 2) and the photograph verification system 200 automatically classifies the uploaded photo as described above. If the classification of the photograph by the classification model 204 matches the classification type for the prompted upload (step 402), the rental management application program 32 determines whether there are additional uploads required (step 404), and if so returns to step 400 to prompt those uploads. Returning to step 402, if the classification of the photo by the classification model 204 does not match the classification type for the prompted upload, the rental management application program 32 determines whether the customer has exceeded a predefined maximum number of attempts (e.g., two attempts) to upload a photo of the requested classification type (step 406). If the maximum number of attempts has not been reached, the rental management application program 32 returns to step 400 and automatically prompts the customer again to upload the expected photo type. If, at step 406, the maximum number of attempts has been reached, the rental management application program 32 can default to allowing an 'incorrect' photo to prevent harming the user experience in case of unavoidable errors or unidentified phototypes and/or can notify the CSR to assist the customer with the uploading process (step 408).

CONCLUSION

From the foregoing, it will be seen that the present invention has numerous advantages. It provides a method and system that can automatically classify an uploaded photograph to determine if it is the correct type of photograph. It can automatically determine the region of interest for an uploaded photograph based on the type of the photograph. It can be used to decrease the time customer service representatives (CSRs) spend in qualifying customers. Additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A method for automatically verifying an image uploaded to a computer system by a customer, the method comprising:
    generating an upload prompt to request a customer to upload an image of a requested type to a computer system, wherein the requested type of image comprises one of a headshot of the customer, a front of an identification card of the customer, or a back of an identification card of the customer;
    receiving with the computer system an image uploaded in response to the upload prompt;
    automatically processing the uploaded image with a computer-implemented classification model operative to attempt to classify the uploaded image as one of a headshot, a front of an identification card, or a back of an identification card;
    if the classification model classifies the uploaded image as a headshot, automatically processing the uploaded image with a face detection model operative to return a headshot return result that includes a face bounding box for the uploaded image;
    if the classification model classifies the uploaded image as a front of an identification card:
        automatically processing the uploaded image with an identification card detection model operative to return an identification card front return result that includes an identification card front bounding box for the uploaded image; and
        using the identification card front bounding box to process the uploaded image with the face detection model to return an identification card headshot return result that includes an identification card face bounding box for the uploaded image; and
    if the classification model classifies the uploaded image as a back of an identification card, processing the uploaded image with the identification card detection model to return an identification card back return result that includes an identification card back bounding box for the uploaded image;
    wherein the classification model is implemented via a convolutional neural network having an architecture that comprises a modification of an Inception v3 architecture, wherein the modification of the Inception v3 architecture includes a global max pool layer, a fully connected layer and an output max layer in place of a fully connected layer of the Inception v3 architecture.

2. The method of claim 1 further comprising comparing the classification of the uploaded image with the expected image type requested by the upload prompt to verify that that the image type of the uploaded image matches the expected image type requested by the upload prompt.

3. The method of claim 1 wherein the step of automatically processing the uploaded image with a computer-implemented classification model comprises processing the uploaded image using a convolutional neural network.

4. The method of claim 1 wherein the identification card detection model is implemented via a region-based convolutional neural network.

5. The method of claim 1 wherein the identification card detection model returns an identification card front bounding box that is a centermost bounding box of a plurality of bounding boxes proposed by the identification card detection model for the uploaded image.

6. The method of claim 1 wherein the face detection model comprises a single-stage face detector model.

7. A method for automatically validating an image uploaded to a computer system by a customer, the system comprising:
    generating an upload prompt to request a customer to upload an image of a requested type to a computer system, wherein the requested type of image comprises one of a headshot of the customer, a front of an identification card of the customer, or a back of an identification card of the customer;
    receiving with the computer system an image uploaded in response to the upload prompt;
    automatically processing the uploaded image with a classification model operative to return (i) a first probability that the uploaded image comprises an image of a headshot, (ii) a second probability that the uploaded image comprises an image of a front of an identification card, and (iii) a third probability that the uploaded image comprises an image of a back of an identification card;
    using the returned first probability, second probability and third probability to classify the image as one of a headshot, a front of a driver's license, a back of a driver's license, or a rogue image;
    if the classification model classifies the uploaded image as a headshot, automatically processing the uploaded image with a face detection model operative to return a headshot return result that includes a face bounding box for the uploaded image;
    if the classification model classifies the uploaded image as a front of an identification card:
        automatically processing the uploaded image with an identification card detection model to return an identification card front return result that includes an identification card front bounding box for the uploaded image; and
        using the identification card front bounding box to process the uploaded image with the face detection model to return an identification card headshot return result that includes an identification card face bounding box for the uploaded image; and
    if the classification model classifies the uploaded image as a back of an identification card, processing the uploaded image with the identification card detection model to return an identification card back return result that includes an identification card back bounding box for the uploaded image;

wherein the classification model is implemented via a convolutional neural network having an architecture that comprises a modification of an Inception v3 architecture, wherein the modification of the Inception v3 architecture includes a global max pool layer, a fully connected layer and an output max layer in place of a fully connected layer of the Inception v3 architecture.

8. The method of claim 7 further comprising comparing the classification of the uploaded image with the expected image type requested by the upload prompt to verify that the image type of the uploaded image matches the expected image type requested by the upload prompt.

9. The method of claim 7 wherein the step of automatically processing the uploaded image with a classification model comprises processing the uploaded image using a convolutional neural network.

10. The method of claim 7 wherein the identification card detection model is implemented via a region-based convolutional neural network.

11. The method of claim 7 wherein the identification card detection model returns an identification card front bounding box that is a centermost bounding box of a plurality of bounding boxes proposed by the identification card detection model for the uploaded image.

12. The method of claim 7 wherein the face detection model comprises a single-stage face detector model.

13. A computerized image verification system for automatically verifying an image uploaded by a customer, the image verification system comprising:
an input component operative to receive images uploaded to the system;
a storage component operative to store information relating to the images uploaded to the system; and
a processor in communication with the input component and the storage component and operative:
to receive an image uploaded to the customer verification system in response to an upload prompt requesting a customer to upload an image having an image type of a headshot of the customer, a front of an identification card of the customer, or a back of an identification card of the customer;
to automatically input the uploaded image to a classification neural network trained to attempt to classify the type of the uploaded image as one of a headshot, a front of an identification card, or a back of an identification card;
if the classification neural network classifies the uploaded image as a headshot, to automatically input the uploaded image to a face detection model configured to return a headshot return result that includes a face bounding box for the uploaded image;
if the classification neural network classifies the uploaded image as a front of an identification card:
to automatically input the uploaded image to an identification card detection neural network operative to return an identification card return result that includes an identification card front bounding box for the uploaded image; and
to use the identification card front bounding box to process the uploaded image with the face detection model to return an identification card headshot return result that includes a face bounding box of a detected face for the identification card front bounding box for the uploaded image; and if the classification neural network classifies the uploaded image as a back of an identification card, processing the uploaded image with the identification card detection neural network to return a return result that includes an identification card back bounding box for the uploaded image;
wherein the classification neural network comprises a convolutional neural network having an architecture that comprises a modification of an Inception v3 architecture, wherein the modification includes a global max pool layer, a fully connected layer and an output max layer in place of a fully connected layer of the Inception v3 architecture.

14. The image verification system of claim 13 further comprising comparing the classification of the uploaded image with the expected image type requested by the upload prompt to verify that that the image type of the uploaded image matches the expected image type requested by the upload prompt.

15. The image verification system of claim 13 wherein the classification neural network comprises a convolutional neural network.

16. The image verification system of claim 13 wherein the identification card detection neural network comprises a region-based convolutional neural network.

17. The image verification system of claim 13 wherein the identification card detection neural network is configured to determine the identification card front bounding box by selecting a centermost bounding box of a plurality of bounding boxes proposed by the identification card detection neural network for the uploaded image.

18. The customer verification system of claim 1 wherein the face detection model comprises a single-stage face detector model.

19. A method for automatically verifying an image uploaded to a computer system by a customer, the method comprising:
generating an upload prompt to request a customer to upload an image of a requested type to a computer system, wherein the requested type of image comprises one of a headshot of the customer, a front of an identification card of the customer, or a back of an identification card of the customer;
receiving with the computer system an image uploaded in response to the upload prompt;
automatically processing the uploaded image with a computer-implemented classification model operative to attempt to classify the uploaded image as one of a headshot, a front of an identification card, or a back of an identification card; and
comparing the classification of the uploaded image with the image type requested by the upload prompt to verify that the image type of the uploaded image matches the image type requested by the upload prompt;
wherein the classification model is implemented via a convolutional neural network having an architecture that comprises a modification of an Inception v3 architecture, wherein the modification of the Inception v3 architecture includes a global max pool layer, a fully connected layer and an output max layer in place of a fully connected layer of the Inception v3 architecture.

* * * * *